Dec. 20, 1960    T. R. SCHUERGER ET AL    2,965,265
MECHANISM AND METHOD FOR REGULATING FEED OF MATERIAL
Filed July 2, 1958
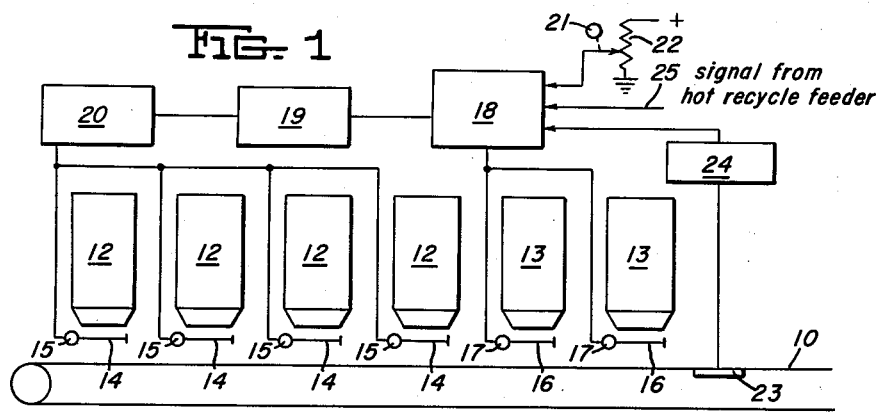
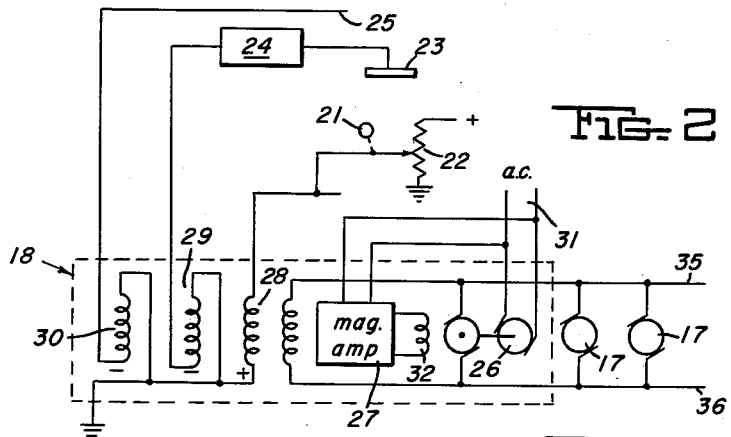
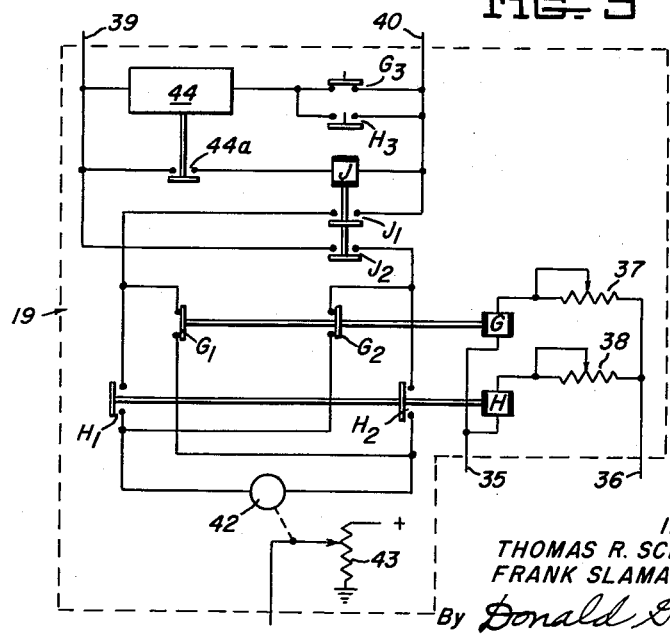
INVENTORS
THOMAS R. SCHUERGER and
FRANK SLAMAR
By Donald G. Dalton
            Attorney

United States Patent Office 2,965,265
Patented Dec. 20, 1960

2,965,265

MECHANISM AND METHOD FOR REGULATING FEED OF MATERIAL

Thomas R. Schuerger and Frank Slamar, Monroeville, Pa., assignors to United States Steel Corporation, a corporation of New Jersey Filed July 2, 1958, Ser. No. 746,261

10 Claims. (Cl. 222—1)

This invention relates to an improved mechanism and method for regulating feed of material from a plurality of sources to a common receiver.

An earlier application of the present co-inventor Schuerger, Serial No. 579,326, filed April 19, 1956, now abandoned, discloses an apparatus and method for automatic proportioning of ingredients of a sinter feed applicable especially to iron ore. The apparatus includes a main conveyor belt, a series of bins located above the belt and containing the individual ingredients, and table feeders for feeding these ingredients in controlled quantities to the belt. Several bins farthest from the discharge end of the belt contain ore fines and equivalents. The next bins contain additives, such as coke and anthracite fines, flue dust and sized returns. The bin nearest the discharge end contains hot fines returned from the sintering machine for recycling. These fines, known as "hot recycle," are another equivalent of ore and must be used approximately as received, except that the bin allows sufficient surge capacity to permit their feeding to the belt at uniform rates for reasonable periods. When the hot recycle feed rate is changed, a compensating inverse change is made in the ore feed rate to maintain the total substantially constant. The invention claimed in the earlier application covers a control for automatically proportioning additives in accordance with combined weight of ore and hot recycle, even though hot recycle reaches the belt after the additives. The mechanism and method of the present invention are particularly suited for regulating the ore feed in a system like that shown in the earlier application. Nevertheless the invention is not thus limited, but may be applied elsewhere to overcome analogous problems.

An object of the present invention is to provide an improved mechanism and method for automatically maintaining the weight of material feeding from a plurality of sources to a common receiver at a predetermined but variable total.

A further object is to provide an improved mechanism and method of the foregoing type in which routine adjustments in the total feed rate are effected by changing the feed rate from only one or two of the sources, and unusual adjustments in the total by changing the rate from additional sources.

A further object, as applied to an apparatus for compounding sinter feed, is to provide an improved mechanism and method for regulating ore feed rate in accordance with a varying hot recycle feed rate to maintain the sum of the two rates substantially constant at any operating level.

A more specific object, as applied to an apparatus for compounding sinter feed, is to provide an improved mechanism and method for automatically regulating ore feed in which routine adjustments in the total ore feed are made continuously by changing the feed rate from one or two "trimmer" bins, but unusual adjustments in the total are made by periodically changing the feed rate from the other bins.

In accomplishing these and other objects of the invention, we have provided improved details of structure, a preferred form of which is shown in the accompanying drawing, in which:

Figure 1 is a diagrammatic side elevational view of a portion of a sinter feed compounding apparatus equipped with an ore feed regulating mechanism in accordance with our invention;

Figure 2 is a schematic wiring diagram of the control circuit for the motors which operate the trimmer bin feeders embodied in our mechanism; and Figure 3 is a schematic wiring diagram of the reset circuit and the control circuit for the motors which operate the feeders from the other bins.

Figure 1 shows a portion of a sinter feed compounding apparatus similar to that of the aforesaid earlier application. The portion shown includes the feed end of a suitably driven main conveyor belt 10, a plurality of ore bins 12, and two additional trimmer ore bins 13, all supported above the belt. As used herein, the term "ore" of course includes equivalents, such as mill scale. Bins 12 are equipped with respective table feeders 14 driven by variable speed D.-C. motors 15. Normally these motors run at a uniform speed, which changes only when unusually large adjustments are made in the ore feed rate, and then on a periodic basis. The trimmer bins are similarly equipped with table feeders 16 driven by variable speed D.-C. motors 17. These latter motors run at a continually varying speed, which changes whenever routine adjustments are made in the ore feed. In each instance the weight of material fed from the bin is approximately a function of the motor speed.

Our regulating mechanism includes a control circuit 18 for motors 17, a reset circuit 19, and a control circuit 20 for motors 15, shown only in block diagram in Figure 1. Circuit 18 receives three voltage input signals proportionate respectively to (a) the desired sum of the ore and hot recycle feed rates, (b) the total weight of ore actually fed to belt 10, and (c) the rate at which the hot recycle feeder is set to operate. This circuit normally acts in accordance with these signals to adjust the speed of motors 17 and the feed rate from the trimmer bins 13 to maintain the sum of the ore and hot recycle feed rates at the constant desired level. When the input signals to circuit 18 indicate need for an unusually large adjustment, the circuit transmits a signal to the reset circuit 19, which is connected to the control circuit 20. On receiving such a signal, the reset circuit transmits periodic signals to circuit 20 to change the speed of motors 14 and the feed rate from bins 12 by increments. These periodic signals discontinue when circuit 18 ceases to transmit a signal to the reset circuit.

The first input signal, proportionate to the desired sum of the ore and hot recycle feed rates, is set through a control knob 21 and potentiometer 22. The knob is mechanically connected to the potentiometer arm. The slide wire of the potentiometer is electrically connected to a suitable volage source, and the arm is electrically connected to the circuit 18. Thus the position to which the arm is set with respect to the slide wire determines the voltage transmitted to the circuit.

The second input signal, proportionate to total weight of ore, originates from a belt scale 23, which the belt traverses after it passes the last ore bin 13. The scale is not shown in detail since devices suitable for the purpose are known and available commercially. Nevertheless reference can be made to Frazel Patent No. 2,664,286 for a detailed showing of one such device. The Frazel scale transmits a pneumatic pressure signal, which we apply to a transducer 24 to convert it to a proportionate voltage signal. The transducer is not shown in detail, since devices suitable for this purpose likewise are known and available commercially. Nevertheless reference can be made to Carlson Patent No. 2,059,549 for detailed showing of one such device.

The third input signal, proportionate to the hot recycle, comes from a line 25. Preferably the mechanism of the present invention is used in conjuction with a hot recycle control mechanism like that shown in our copending application Serial No. 739,870, filed June 4, 1958, which transmits an appropriate signal directly. Otherwise this signal can be obtained by connecting another tranducer, not shown, to the line which transmits the hot recycle signal to the summator in the aforesaid Schuerger application.

*Control circuit for trimmer bin feeder motors*

As shown in Figure 2, the control circuit 18 for the trimmer bin feeder motors 17 includes a motor-generator 26 and a magnetic amplifier 27, which has three control windings 28, 29, and 30. Winding 28 is connected in opposition to windings 29 and 30. The three input signal voltages to the circuit are applied to these respective windings, that is, the voltage ($a$) proportionate to the desired sum is applied to winding 28, the voltage ($b$) proportionate to the total ore feed to winding 29, and the voltage ($c$) proportionate to the hot recycle setting to winding 30. Thus the resultant voltage is proportionate to any difference between the actual sum of the ore and hot recycle feed rates and the desired sum. The motor portion of the motor-generator 26 and the magnetic amplifier 27 are connected to a suitable A.-C. source 31. The magnetic amplifier is connected to a field winding 32 of the D.-C. generator portion of the motor-generator. The generator portion energizes motors 17.

If the actual sum of the ore and hot recycle feed rates equals the desired sum, the resultant voltage on the control windings 28, 29 and 30 is balanced at a level sufficient to drive the D.-C. generator at the voltage needed for proper operation of the table feeder motors 17. The voltage applied to the generator field 32 is constant, whereby the output of the generator and the speed of motors 17 are constant. If the voltage proportionate to the hot recycle feed rate increases, there is an instantaneous decrease in the resultant voltage on the control windings. The voltage applied to the generator field 32 decreases, whereby the output of the generator and the speed of motors 17 decrease. Less ore feeds from the trimmer bins 13, presently decreasing the voltage signal proportionate to the ore feed rate. The resultant voltage on the control windings reaches a new stable level, and motors 17 continue to run at a smaller constant speed until further adjustment is needed. If the control knob 21 is adjusted to decrease the desired feed rate or if a change in characteristics of the ore increases the ore feed rate, the action is similar. If the voltage proportionate to the hot recycle feed rate decreases, or if the knob is adjusted to increase the desired rate, or if characteristics of the ore decrease the ore feed rate, the reverse action takes place.

We have not described the magnetic amplifier in detail since it is a known device, but for a complete description reference can be made to Storm, "Magnetic Amplifiers," copyright, 1955, by General Electric Company. An explanation of the way a magnetic amplifier can be used as a voltage regulator for a D.-C. generator appears on pages 418 and 419 of this publication.

*Reset circuit*

A pair of conductors 35 and 36 extend from opposite sides of the generator portion of the motor-generator 26 to the reset circuit 19, where they are connected to the coils of a low limit voltage relay G and a high limit voltage relay H. Variable resistors 37 and 38 are connected in series with the coils of relays G and H respectively. During normal operation of the mechanism, relay G is energized and relay H deenergized. If the voltage output of the generator drops below a predetermined value, relay G drops out, and conversely if the voltage output rises above a higher predetermined value, relay H picks up. These conditions indicate that the feed rate from the trimmer bins 13 either has unduly decreased or increased, and an adjustment is needed in the feed rate from the other bins 12. The operating levels for the relays G and H can be adjusted by varying the resistors 37 and 38.

The reset circuit is energized via lines 39 and 40 connected to a suitable D.-C. source. The circuit includes a reversible motor 42 and a potentiometer 43 whose arm is mechanically connected to the motor. Relay G has back contacts $G_1$ and $G_2$ and relay H has front contacts $H_1$ and $H_2$, adapted when closed to condition current paths from lines 39 and 40 to the motor. When relay G drops out and contacts $G_1$ and $G_2$ close, the motor is conditioned to run in a direction to decrease the resistance offered by potentiometer 43. When relay H picks up and contacts $H_1$ and $H_2$ close, the motor is conditioned to run in the reverse direction.

The circuit also includes a timer 44 and another relay J. The timer is of a type which has an adjustable "on-time" and an adjustable "off-time" that repeat as long as the timer is running. Such timers per se are known and are available commercially; hence no detailed description is deemed necessary. Nevertheless reference can be made to a printed publication by General Electric Company entitled "TSA Industrial Interval Timer" for a complete showing and description of a suitable timer of this type. The timer is connected across lines 39 and 40 preferably in series with back contacts $G_3$ of relay G and front contacts $H_3$ of relay H. These contacts keep the timer from running unless it is needed, that is, unless one of these relays acts to change the feed rate from bins 12. The timer controls contacts $44a$, which close during its "on-time" but open during its "off-time," or when it is not running. Contacts $44a$ and the coil of relay J are connected in series across lines 39 and 40, whereby the relay picks up when the timer goes into "on-time," but otherwise drops out. Relay J has two sets of front contacts $J_1$ and $J_2$ in series with opposite sides of motor 42. Thus the motor runs periodically to adjust potentiometer 43 in the appropriate direction whenever relay G drops out or relay H picks up. The magnitude of each adjustment increment can be varied by changing the length of "on-time" of timer 44. The "off-time" is sufficient for the portion of belt 10 on which the feed has been changed to reach the scale 23 so that the change is reflected in the signal transmitted from the scale to circuit 18. When the total change is effective to pick up relay G or drop out relay H, the reset circuit ceases to operate.

The slide wire of potentiometer 43 is connected to a suitable D.-C. source. The arm is electrically connected to the control circuit 20 for motors 15. This circuit is not illustrated in detail since it can be of any conventional type, such as a motor-generator and magnetic amplifier similar to circuit 18, but simplified by omission of extra control windings. Changes in voltage transmitted from the potentiometer 43 act to change the speed of the motors in the same manner.

From the foregoing description, it is seen that our mechanism and method afford a fully automatic control for regulating the weight of material fed from a plurality of sources to maintain a predetermined total. Routine adjustments in the total are accomplished by changing the feed rate from only one or two sources without disturbing the others. Nevertheless large adjustments which require changing the feed rate from other sources are readily made and also are fully automatic.

While we have shown and described a preferred embodiment of the invention, it is apparent that other modifications may arise. For example, one of the bins 12 can be operated as a bias bin not connected to the control mechanism, but set manually to feed at a steady

We claim:

1. In a compounding apparatus which includes a plurality of sources of equivalent materials, at least one of said sources being a trimmer source, adjustable means for feeding materials from the respective sources, a receiver for the materials, and means for transmitting signals indicative of a need to adjust the total feed rate, the combination therewith of a mechanism for regulating the feed rate comprising control means operatively connected with the feeding means from said trimmer source and with said transmitting means, said control means on receiving signals of a need for adjustment changing the feed rate from said trimmer source to effect routine adjustments in the total and indicating when larger adjustments are needed, and means operatively connected with said control means and with other of said feeding means for changing their feed rates to effect larger adjustments in the total.

2. In a compounding apparatus which includes a plurality of sources of equivalent materials, at least one of said sources being a trimmer source, adjustable means for feeding materials from the respective sources, a receiver for the materials, and means for transmitting signals indicative of a need to adjust the total feed rate, the combination therewith of a mechanism for regulating the feed rate to said receiver and maintaining it at a predetermined total comprising control means operatively connected with the feeding means from said trimmer source and with said transmitting means, said control means on receiving signals of a need for adjustment acting on a continuous basis to change the feed rate from said trimmer source to effect routine adjustments in the total and indicating when larger adjustments are needed, and means operatively connected with said control means and with other of said feeding means acting periodically for changing their feed rates to effect incremental larger adjustments in the total.

3. In a compounding apparatus which includes a plurality of sources of equivalent materials, at least one of said sources being a trimmer source, adjustable means for feeding materials from the respective sources, a receiver for the materials, and means for transmitting signals indicative of a need to adjust the total feed, the combination therewith of a mechanism for regulating the feed rate to said receiver and maintaining it at a predetermined total comprising a first control means operatively connected with the feeding means from said trimmer source and with said transmitting means, said first control means on receiving signals of a need for adjustment acting on a continuous basis to change the feed rate from said trimmer source to effect routine adjustments in the total and indicating when larger adjustments are needed, reset means operatively connected with said first control means responsive to such indications therefrom, and a second control means operatively connected with said reset means and operated periodically thereby for changing the feed rates from other of said sources to effect incremental larger adjustments in the total.

4. In an apparatus for compounding sinter feed, which apparatus includes a plurality of ore bins, at least one of said bins being a trimmer bin, adjustable means for feeding ore from the respective bins, a conveyor for receiving the ore, and means for transmitting signals indicative of a need to adjust the ore feed rate, the combination therewith of a mechanism for regulating the ore feed rate comprising control means operatively connected with the feeding means from said trimmer bin and with said transmitting means, said control means on receiving signals of a need for adjustment changing the feed rate from said trimmer bin to effect routine adjustments in the total and indicating when larger adjustments are needed, and means operatively connected with said control means and with the feeding means from other of said bins for changing their feed rates to effect larger adjustments in the total.

5. In an apparatus for compounding sinter feed, which apparatus includes a plurality of ore bins, at least one of said bins being a trimmer bin, adjustable means for feeding ore from the respective bins, a conveyor for receiving the ore, and means for transmitting signals indicative of a need to adjust the ore feed rate, the combination therewith of a mechanism for regulating the ore feed rate to said conveyor and maintaining it at a predetermined total comprising a first control means operatively connected with the feeding means from said trimmer bin and with said transmitting means, said first control means on receiving signals of a need for adjustment acting on a continuous basis to change the feed rate from said trimmer bin to effect routine adjustments in the total and indicating when larger adjustments are needed, reset means operatively connected with said first control means responsive to such indications therefrom, and a second control means operatively connected with said reset means and operated periodically thereby for changing the feed rates from other of said bins to effect incremental larger adjustments in the total.

6. In an apparatus for compounding sinter feed, which apparatus includes a plurality of ore bins, at least one of said bins being a trimmer bin, adjustable means for feeding ore from the respective bins, a conveyor for receiving the ore and ingredients fed later including hot recycle, and means for transmitting signals proportionate to the desired sum of the ore and hot recycle feed rates, to the actual ore feed rate, and to the actual hot recycle feed rate, the combination therewith of a mechanism for regulating the ore feed rate comprising control means operatively connected with the feeding means from said trimmer bin and with said transmitting means, said control means being operated by signals indicative of a difference between the actual and desired sums to change the feed rate from said trimmer bin to effect routine adjustments in the total ore feed and to indicate when larger adjustments are needed, and means operatively connected with said control means and with other of said feeding means for changing their feed rates to effect larger adjustments.

7. In an apparatus for compounding sinter feed, which apparatus includes a plurality of ore bins, at least one of said bins being a trimmer bin, adjustable means for feeding ore from the respective bins, a conveyor for receiving the ore and ingredients fed later including hot recycle, and means for transmitting signals proportionate to the desired sum of the ore and hot recycle feed rates, to the actual ore feed rate, and to the actual hot recycle feed rate, the combination therewith of a mechanism for regulating the ore feed rate and maintaining the sum of the ore and hot recycle feed rates constant comprising control means operatively connected with the feeding means from said trimmer bin and with said transmitting means, said control means being operated by signals indicative of a difference between the actual and desired sums on a continuous basis to change the feed rate from said trimmer bin to effect routine adjustments in the total ore feed and to indicate when larger adjustments are needed, and means operatively connected with said control means and with other of said feeding means acting periodically for changing their feed rates to effect incremental larger adjustments in the total.

8. A method of regulating the total rate of feed of equivalent materials from a plurality of sources to a common receiver comprising signalling the need for routine adjustments in the total with signals of relatively small magnitude and the need for larger adjustments in the total with signals of greater magnitude, changing the rate of feed from one source in response to signals of either magnitude to effect the routine adjustments, and changing the rate of feed from other of said sources in response only to the signals of greater magnitude to effect the larger adjustments.

9. A method of regulating the total rate of feed of equivalent materials from a plurality of sources to a common receiver comprising signalling the need for routine adjustments in the total with signals of relatively small magnitude and the need for larger adjustments in the total with signals of greater magnitude, changing the rate of feed from one source on a continuous basis in response to signals of either magnitude to effect the routine adjustments, and at intervals changing the rate of feed from other of said sources in response only to the signals of greater magnitude to effect the larger adjustments by increments.

10. In a sinter feed compounding operation, a method of regulating the ore feed rate from a plurality of bins to a common receiver comprising signalling the need for routine adjustments in the total ore feed rate with signals of relatively small magnitude and the need for larger adjustments in the total ore feed rate with signals of greater magnitude, changing the rate of feed from one of said bins on a continuous basis in response to signals of either magnitude to effect the routine adjustments, and at intervals changing the rate of feed from other of said bins in response only to the signals of greater magnitude to effect the larger adjustments by increments.

References Cited in the file of this patent

UNITED STATES PATENTS

| | | |
|---|---|---|
| 1,339,486 | Stuart | May 11, 1920 |
| 1,922,883 | Crago | Aug. 15, 1933 |
| 2,322,373 | Lowe | June 22, 1943 |